United States Patent
Bauer et al.

(10) Patent No.: US 10,784,728 B2
(45) Date of Patent: Sep. 22, 2020

(54) ROTOR FOR AN ELECTRICAL MACHINE WITH PUSH-ON WINDINGS

(71) Applicant: Bayerische Motoren Werke Aktiengesellschaft, Munich (DE)

(72) Inventors: Maria Bauer, Erding (DE); Dragoljub Duricic, Munich (DE); Zakaria El Khawly, Munich (DE); Daniel Loos, Munich (DE); Andreas Mayr, Waldkraiburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/410,374

(22) Filed: May 13, 2019

(65) Prior Publication Data

US 2019/0267857 A1    Aug. 29, 2019

Related U.S. Application Data

(63) Continuation of application No. PCT/EP2017/076037, filed on Oct. 12, 2017.

(30) Foreign Application Priority Data

Nov. 15, 2016   (DE) .......................... 10 2016 222 356

(51) Int. Cl.
*H02K 3/487* (2006.01)
*H02K 1/26* (2006.01)

(52) U.S. Cl.
CPC ............ *H02K 1/265* (2013.01); *H02K 3/487* (2013.01)

(58) Field of Classification Search
CPC .............................. H02K 1/265; H02K 3/487
(Continued)

(56) References Cited

U.S. PATENT DOCUMENTS

| 3,600,618 A | 8/1971 | Nicholas et al. |
| 2004/0143956 A1* | 7/2004 | Haller .............. H02K 15/10 |
| | | 29/596 |

(Continued)

FOREIGN PATENT DOCUMENTS

| CH | 245 797 A | 8/1947 |
| DE | 215 102 A | 9/1908 |

(Continued)

OTHER PUBLICATIONS

International Search Report (PCT/ISA/210) issued in PCT Application No. PCT/EP2017/076037 dated Jan. 2, 2018 with English translation (four (4) pages).

(Continued)

*Primary Examiner* — Alex W Mok
(74) *Attorney, Agent, or Firm* — Crowell & Moring LLP

(57) ABSTRACT

A rotor for an electrical machine has a rotor core with a center line, which forms an axis of rotation. The rotor core can be subdivided by a plurality of imaginary radial planes, which extend radially from the axis of rotation at regular angular intervals. For each radial plane, at least one pair of winding grooves is formed, which extend through the rotor core to either side of the radial plane with the radial plane serving as the plane of symmetry. A winding is arranged in each pair of winding grooves, in winding receiving areas of the winding grooves, which winding extends through the two winding grooves of the pair. Each winding groove is bounded in its winding receiving area on its side facing the assigned radial plane by a side face, which continues in a manner free from projections, in the sense of projections in a direction away from the radial plane, from the winding receiving area to the radially outer end of the winding groove.

10 Claims, 2 Drawing Sheets

(58) Field of Classification Search
USPC .......................................................... 310/179
See application file for complete search history.

(56) References Cited

U.S. PATENT DOCUMENTS

| 2004/0145267 | A1* | 7/2004 | Lowry | H02K 3/487 |
| | | | | 310/215 |
| 2015/0028711 | A1 | 1/2015 | Bulatow et al. | |
| 2015/0035394 | A1* | 2/2015 | Bulatow | C22C 38/02 |
| | | | | 310/66 |

FOREIGN PATENT DOCUMENTS

| EP | 1 998 425 A2 | 12/2008 |
| EP | 2 228 888 A1 | 9/2010 |
| FR | 392 904 A | 12/1908 |
| WO | WO 2013/006079 A1 | 1/2013 |
| WO | WO 2013/110656 A1 | 8/2013 |

OTHER PUBLICATIONS

German-language Written Opinion (PCT/ISA/237) issued in PCT Application No. PCT/EP2017/076037 dated Jan. 2, 2018 (six (6) pages).
German Search Report issued in counterpart German Application No. 10 2016 222 356.9 dated Jul. 24, 2017 with English translation (14 pages).

* cited by examiner

ROTOR FOR AN ELECTRICAL MACHINE WITH PUSH-ON WINDINGS

CROSS REFERENCE TO RELATED APPLICATIONS

This application is a continuation of PCT International Application No. PCT/EP2017/076037, filed Oct. 12, 2017, which claims priority under 35 U.S.C. § 119 from German Patent Application No. 10 2016 222 356.9, filed Nov. 15, 2016, the entire disclosures of which are herein expressly incorporated by reference.

BACKGROUND AND SUMMARY OF THE INVENTION

The invention relates to a rotor for an electrical machine, to an electrical machine having such a rotor, to a motor vehicle having such an electrical machine, and to a method for producing a rotor for an electrical machine.

At present in the automobile industry, rotors in salient pole design are used for current-excited synchronous machines. However, these are in need of improvement with regard to their thermal behavior as well as the expense in the coil winding method.

One problem which the invention proposes to solve is to meet this need for improvement.

According to one exemplary embodiment of the invention, a rotor for an electrical machine is provided, having a rotor core with a center line which forms an axis of rotation, wherein the rotor core can be subdivided by a plurality of imaginary radial planes, which extend radially from the axis of rotation at regular angular intervals; wherein for each radial plane at least one pair of winding grooves is formed, which extend through the rotor core to either side of the radial plane with this serving as the plane of symmetry, in particular a center line of the winding grooves is herein parallel to the axis of rotation; wherein a winding is arranged in each pair of winding grooves, in winding receiving areas of the winding grooves, which winding extends through the two winding grooves of the pair, wherein each winding groove is bounded in its winding receiving area on that side facing the associated radial plane by a side face, which continues in a manner free from projections, in the sense of projections in a direction away from the radial plane, from the winding receiving area to the radially outer end of the winding groove. This embodiment has the benefit that the windings are wound outside the rotor and then can be inserted into the winding grooves. That is, the windings do not have to be wound on the legs of the rotor, as in the prior art, which is much more costly, because the wire has to be led around the legs. The coils or windings in this exemplary embodiment can be wound in a finished state separately from the rotor and be inserted in the completely wound state into the winding grooves of the rotor.

According to another exemplary embodiment of the invention, the winding grooves are closed radially outside the windings by sealing strips, which are led in sealing grooves which extend in side faces of the winding grooves parallel to the axis of rotation. These sealing strips can be easy to install and hold the windings reliably in the winding grooves.

According to another exemplary embodiment of the invention, the sealing strips comprise electrically conductive sealing strips and electrically insulating sealing strips. In particular, the winding grooves closed with the electrically conductive sealing strip are arranged closer to the associated radial plane than the winding grooves closed with the electrically insulating sealing strip. This is advantageous for forming a sinusoidal air gap between the rotor and a stator (not shown) of the electrical machine.

According to another exemplary embodiment of the invention, the windings are wound from a winding wire with a nonround cross section.

In particular, a cross section of the winding wire has four mutually perpendicular side faces, in particular the cross section is substantially square or substantially rectangular. In this way, a large copper fill factor is achieved, since the windings with such a cross section can be packed more tightly. This results in fewer losses and thus in less heat production or a better thermal behavior of the rotor.

According to another exemplary embodiment of the invention, each winding groove is bounded by two side faces, which are parallel to the associated radial plane.

According to another exemplary embodiment of the invention, at least two pairs of winding grooves are provided for each radial plane. Thanks to multiple coils per radial plane, a load due to the coils can be distributed and thus better managed. Future electrical machines have very large numbers of turns, so that the centrifugal force acting on the coils becomes relatively large. This requires more stable measures to hold the coil or the winding in the winding groove, the larger/heavier the coil is. Thanks to multiple pairs of winding grooves, the overall required or desired coil for each radial plane can be divided into a plurality of smaller coils, making it easier to hold the smaller coils in the corresponding winding grooves.

According to another exemplary embodiment of the invention, exactly three pairs of winding grooves are provided for each radial plane. In this way, the benefits described in the preceding paragraph are accomplished, on the one hand, and a good space utilization in the rotor.

Furthermore, the invention provides an electrical machine having such a rotor as well as a motor vehicle having such an electrical machine.

Furthermore, the invention provides a method for producing a rotor for an electrical machine with the steps: winding of windings separately to a rotor core of the rotor, and inserting the windings along a plurality of radial directions of the rotor core spaced apart uniformly in the circumferential direction of the rotor core, wherein each winding is inserted into pairs of winding grooves. With this method, a rotor with the above described benefits can be provided by means of an easier and thus more cost-effective method.

According to another exemplary embodiment, the method moreover involves the step of closing the winding grooves radially outside the windings by axial inserting of sealing strips.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
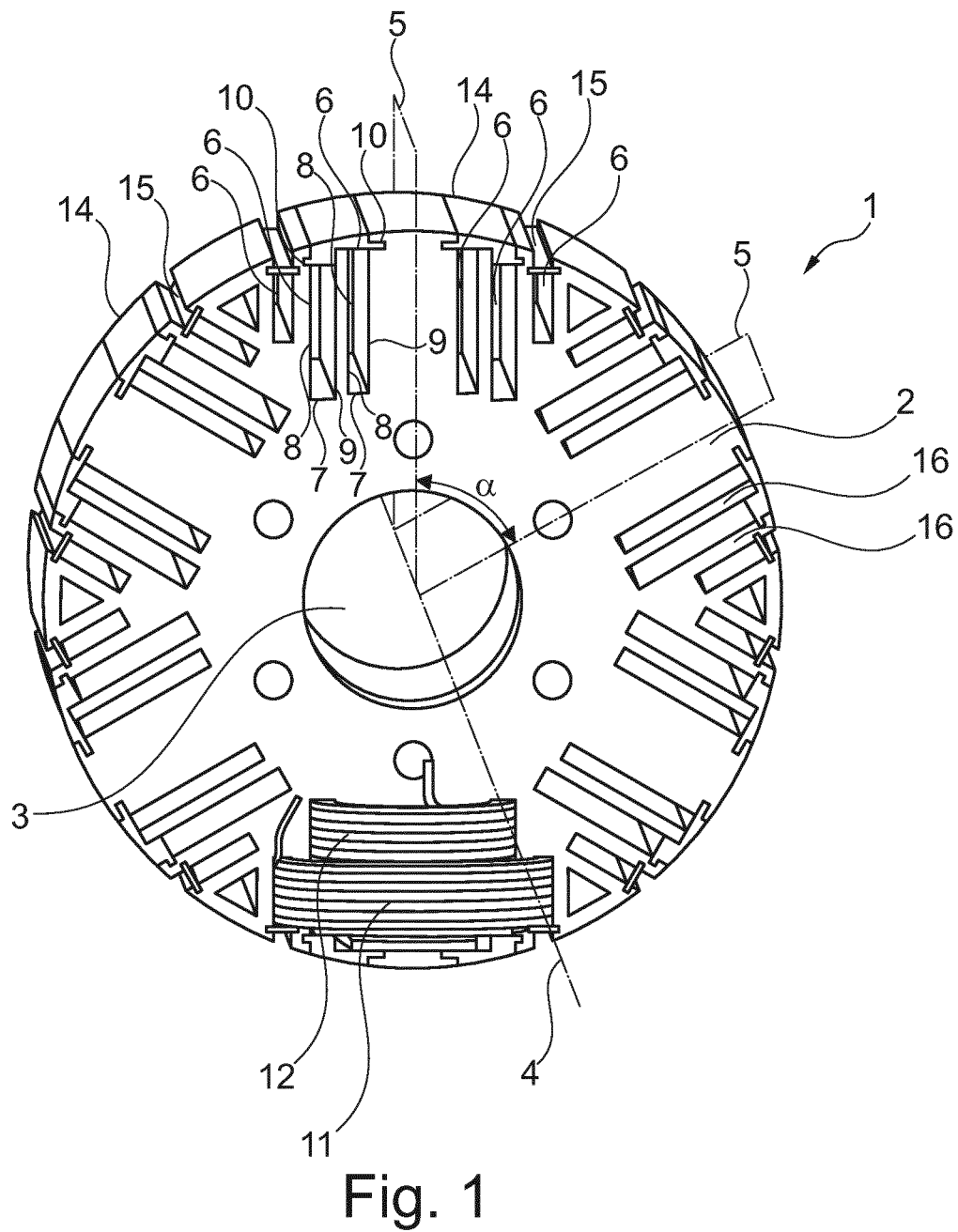
FIG. 1 is a perspective front view of a rotor according to one exemplary embodiment of the invention.
Figure 2:
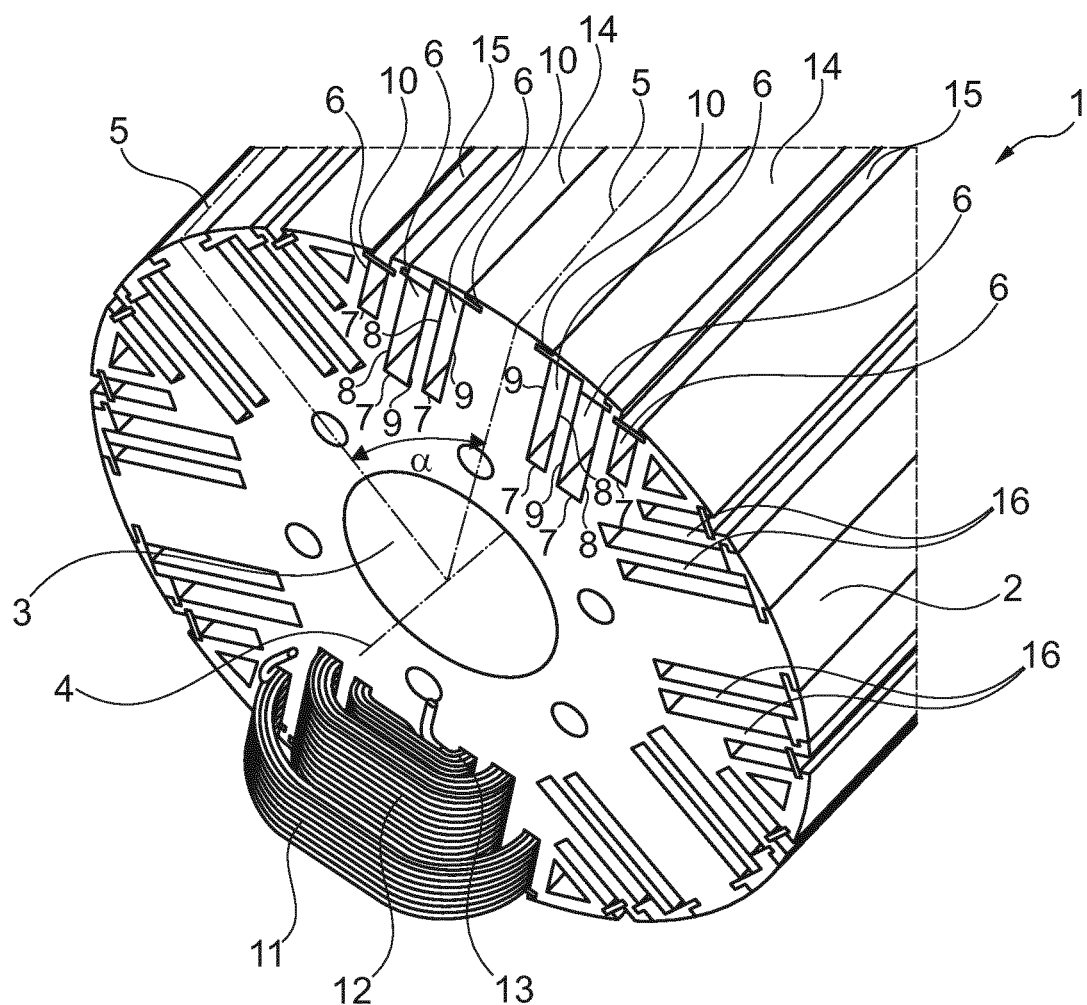
FIG. 2 shows the rotor of FIG. 1 in a perspective view from above.

FIG. 1 shows a perspective front view of a rotor 1 according to one exemplary embodiment of the invention, and FIG. 2 shows the rotor 1 of FIG. 1 in a perspective view from above. The rotor 1 described in more detail below is used in an electrical machine or an electric motor, in which the rotor interacts with a stator. The electrical machine is preferably used in a motor vehicle, especially a passenger car.

The rotor 1 comprises a rotor core 2, which is formed from a plurality of stacked rotor plates. The rotor core 2 has a substantially cylindrical outer circumference and a cylindrical through opening 3, which serves for receiving a shaft (not shown). A center line 4 of the rotor 1 corresponds to a center line of the rotor core 2 and to a center line of the cylindrical through opening 3. The rotor 1 is mounted in the electrical machine so that it can rotate about its center line 4, such that the center line 4 also corresponds to the axis of rotation of the rotor 1. The plurality of rotor plates are identical and each rotor plate is stacked on one another along the center line 4 of the rotor 1, the rotor plates being substantially perpendicular to the center line 4. Preferably, the rotor plates are steel plates.

The rotor core 2 (and thus also the rotor 1) can be divided into a plurality of radial planes 5 in a theoretical or imaginary manner. Each of these imaginary radial planes 5 extends from the axis of rotation or the center line 4 (and contains the center line) radially outward. In FIGS. 1 and 2, two of the six radial planes 5 are indicated by dot and dash lines. Each of these radial planes 5 contains radial lines which are perpendicular to the center line 4. The plurality of radial planes 5 is arranged at regular intervals about the center line 4. In other words, angles α between adjacent radial planes 5 are completely equal to each other. In the instance shown, six radial planes 5 are provided, for example, but the invention is not limited to this and more or fewer radial planes 5 may also be provided.

Each radial plane 5 is associated with at least one pair of winding grooves 6. In the instance shown, each radial plane 5 is associated with precisely three pairs of winding grooves 6, but there may also be two pairs, or more than three pairs. For the sake of clarity, only the winding grooves 6 associated with one radial plane 5 are given a reference number. Each pair of winding grooves 6 has two winding grooves 6, which are arranged on either side of the associated radial plane 5 with the radial plane 5 as the plane of symmetry. The winding grooves 6 are cuboidal, run parallel to the radial plane 5, and pass entirely through the rotor core 2. The winding grooves 6 are bounded by a radially inner face 7, which runs perpendicular to the radial plane 5. Moreover, the winding grooves 6 are bounded by two parallel side faces 8 and 9, which run parallel to the radial plane 5. These side faces 8 and 9 extend radially entirely to the outside (up to the outer circumference of the rotor core 2), while closure grooves 10 are provided in the side faces 8, 9, running parallel to the center line 4. In general, for the sake of clarity, when several elements are present in a plurality, only individual elements are given a reference number.

The winding grooves 6 serve for receiving coils or windings 11, 12, 13, of which each winding 11-13 extends through the winding grooves 6 of a pair of winding grooves. In the instance shown, three such windings 11, 12, 13 are provided, each of them being wound from a continuous copper winding wire. The winding wire preferably has a square or rectangular cross section, in particular with rounded corners, making it possible for the windings to have a larger copper content. In cross section, the cuboidal winding wires namely fill up the available cross-sectional area more than would be done by a winding wire with round circular cross section.

The side faces 9 of the winding grooves 6 facing toward the radial plane 5 are formed free of projections in this exemplary embodiment. By "free of projections" it is meant that the side faces 9 are free of elevations or projections on the sides of the side faces 9 facing away from the associated radial planes, with respect to their plane of extension. In other words, the side faces 9 are free of projections (with respect to the plane of the side face) in the direction away from the radial plane 5. The region of each winding groove 6 serving to receive the associated winding 11-13 is called the winding receiving region. Put more generally, the side face 9 should be continued free of projections from the winding receiving region to the radially outer end of the winding groove 6 (so that projections might be present radially inward of the winding receiving region, without hindering a pushing in of the coils).

Due to these provisions, the windings 11, 12, 13 or coils can be wound separately or outside of the rotor core 2 (i.e. the windings are not wound on the material of the rotor core 2 during the winding process) and can be pushed from the outside in the radially inward direction into the winding grooves 6 in the fully finished wound state, without having to overcome an obstacle (such as a projection). The region at the outer circumference of the rotor core 2 is open toward the outside between the parallel side faces 8 and 9.

Preferably, when several windings are present, an inner winding 13 is arranged in the pair of winding grooves 6 whose two winding grooves 6 are arranged closest to the associated radial plane 5. Another winding 12 runs about the inner winding 13 and is situated in the pair of winding grooves 6 which are adjacent to the winding grooves 6 of the winding 13 and further away from the associated radial plane 5. In the instance illustrated of three windings, the outer winding 11 runs about the two windings 12 and 13 and is arranged in the pair of winding grooves 6 whose winding grooves 6 are the furthest away from the associated radial plane 5. A dimension of the windings 11-13 can be chosen such that the windings 12 and 13 are the same size in a direction parallel to the radial direction and the winding 11 is only half as large as the windings 12 and 13.

After the windings 11-13 have been placed in the winding grooves 6, the winding grooves 6 are closed with sealing strips 14 and 15, in order to hold the windings 11-13 reliably in the winding grooves 6, despite high rotational speed and consequently high centrifugal force. Each winding groove 6 may be associated with its own sealing strip 14, 15. In the present instance, however, two adjacent winding grooves 6 share the sealing strip 14. Preferably, the adjacent winding grooves 6 which are arranged closest to the associated radial plane 5 and both on the same side with respect to the radial plane 5. As already mentioned, closure grooves 10 are provided in the side faces 8 and 9, into which the sealing strips 14 and 15 can be pushed in a direction parallel to the center line 4. In the instance when two adjacent winding grooves 6 share the sealing strip 14, fewer closure grooves 10 are needed, of course. The sealing strip 14 which is arranged closer to the radial plane 5 than the sealing strip 15 is made of an electrically conductive material, such as copper, steel or aluminum. The sealing strip 15 is made of an electrically insulating material, such as plastic. This is advantageous for forming a sinusoidal air gap between the rotor and a stator (not shown) of the electrical machine.

All of the windings 11, 12, 13 associated with the same radial plane 5 are at first separately wound windings made from a continuous winding wire. After being placed in the winding grooves 6, the windings 11, 12, 13 associated with the same radial plane 5 are electrically connected to each other in series at their winding wire ends. That is, all of the windings 11, 12, 13 associated with the same radial plane 5 are connected electrically in series (hereafter known as a "coil group"). These coil groups are in turn connected in series. More precisely, each coil group of the rotor 1 is electrically connected in series with the neighboring coil group in the circumferential direction, until all coil groups have been electrically connected in series, so that on the whole for each rotor there remain two electrical terminals for all the windings 11-13 of the rotor 1.

According to another exemplary embodiment, partition walls 16 separating neighboring winding grooves 6 from each other may also be omitted. Thus, several windings 11-13 could be arranged in a single pair of winding grooves 6. The winding grooves 6 of this single pair of winding grooves per radial plane 5 would preferably be step-shaped, however. But the requirements on stability of the sealing strip closing this larger winding groove would be greater.

While the invention has been illustrated and described in detail in the drawings and the preceding description, this illustration and description should be seen as being illustrative or exemplary and not limiting and it is not intended to limit the invention to the disclosed exemplary embodiments. The mere fact that certain features are mentioned in different dependent claims should not mean that a combination of these features could not also be used advantageously.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for an electrical machine, comprising:
   a rotor core with a center line which forms an axis of rotation, wherein
   the rotor core is subdividable by a plurality of imaginary radial planes which extend radially from the axis of rotation at regular angular intervals,
   for each radial plane, at least one pair of winding grooves is formed, which extend through the rotor core to either side of the radial plane with this serving as the plane of symmetry,
   a winding is arranged in each pair of winding grooves, in winding receiving areas of the winding grooves, which winding extends through the two winding grooves of the pair,
   each winding groove is bounded in its winding receiving area on that side facing the associated radial plane by a side face, which continues in a manner free from projections, in the sense of projections in a direction away from the radial plane, from the winding receiving area to the radially outer end of the winding groove,
   for each radial plane, an outermost pair of winding grooves has a length in a direction parallel to a radial direction that is less than a length of other pairs of winding grooves,
   the winding grooves are closed radially outside the windings by sealing strips, which are led in sealing grooves which extend in side faces of the winding grooves parallel to the axis of rotation, and
   for each radial plane, the sealing strips comprise electrically conductive sealing strips disposed in winding grooves that are closest to the radial plane and electrically insulating sealing strips that are disposed in the outermost pair of winding grooves.

2. The rotor according to claim 1, wherein the windings are wound from a winding wire with a nonround cross section.

3. The rotor according to claim 2, wherein
   a cross section of the winding wire has four mutually perpendicular side faces, the cross section being substantially square or substantially rectangular.

4. The rotor according to claim 1, wherein
   each winding groove is bounded by two side faces, which are parallel to the associated radial plane.

5. The rotor according to claim 1, wherein
   at least two pairs of winding grooves are provided for each radial plane.

6. The rotor according to claim 1, wherein
   exactly three pairs of winding grooves are provided for each radial plane.

7. An electrical machine comprising a rotor according to claim 1.

8. A motor vehicle comprising an electrical machine according to claim 7.

9. A method for producing a rotor for an electrical machine, the method comprising the steps of:
   winding windings separately to a rotor core of the rotor, the rotor core being subdividable by a plurality of imaginary radial planes which extend radially from an axis of rotation at regular angular intervals, and for each radial plane, at least one pair of winding grooves is formed, which extend through the rotor core to either side of the radial plane with this serving as the plane of symmetry; and
   inserting the windings along a plurality of radial directions of the rotor core spaced apart uniformly in a circumferential direction of the rotor core, wherein each winding is inserted into pairs of winding grooves;
   wherein for each radial plane, an outermost pair of winding grooves has a length in a direction parallel to a radial direction that is less than a length of other pairs of winding grooves;
   wherein the winding grooves are closed radially outside the windings by sealing strips, which are led in sealing grooves which extend in side faces of the winding grooves parallel to the axis of rotation, and
   for each radial plane, the sealing strips comprise electrically conductive sealing strips disposed in winding grooves that are closest to the radial plane and electrically insulating sealing strips that are disposed in the outermost pair of winding grooves.

10. The method according to claim 9, further comprising the step of:
    closing the winding grooves radially outside the windings by axially inserting sealing strips.

\* \* \* \* \*